United States Patent
Dutta

(10) Patent No.: US 11,677,658 B2
(45) Date of Patent: Jun. 13, 2023

(54) PACKET ROUTING BASED ON COMMON NODE PROTECTION

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 187 days.

(21) Appl. No.: 16/575,945

(22) Filed: Sep. 19, 2019

(65) Prior Publication Data

US 2021/0092047 A1    Mar. 25, 2021

(51) Int. Cl.
*H04L 45/00* (2022.01)
*H04L 45/28* (2022.01)
(Continued)

(52) U.S. Cl.
CPC .............. *H04L 45/22* (2013.01); *H04L 45/28* (2013.01); *H04L 45/50* (2013.01); *H04L 45/64* (2013.01); *H04L 45/72* (2013.01); *H04L 45/74* (2013.01)

(58) Field of Classification Search
USPC ....... 370/216, 217, 218, 219, 220, 221, 225, 370/226, 227, 228, 242, 243, 244, 245,
(Continued)

(56) References Cited

U.S. PATENT DOCUMENTS 7,315,510 B1 * 1/2008 Owens .................. H04L 12/462
370/218
9,794,148 B1 * 10/2017 Ramachandran ....... H04L 45/22
(Continued)

FOREIGN PATENT DOCUMENTS

WO    WO 2019/239171 A1    12/2019

OTHER PUBLICATIONS

Gredler, H., et al., "North-Bound Distribution of Link-State and Traffic Engineering (TE) Information Using BGP," Internet Engineering Task Force (IETF), RFC 7752, Mar. 2016, 48 pages.
Filsfils C., et al., "Segment Routing Architecture," Internet Engineering Task Force (IETF), RFC 8402, Jul. 2018, 32 pages.
(Continued)

*Primary Examiner* — Nguyen H Ngo
(74) *Attorney, Agent, or Firm* — Tong, Rea, Bentley & Kim, LLC

(57) ABSTRACT

Various example embodiments for supporting rerouting of packets in communication networks are presented. Various example embodiments for supporting rerouting of packets in communication networks may be configured to support rerouting of packets based on common node protection. Various example embodiments for supporting rerouting of packets based on common node protection may be configured to support rerouting of source routed packets in packet switched networks. Various example embodiments for supporting rerouting of packets based on common node protection may be configured to support rerouting of source routed packets based on segment routing (SR). Various example embodiments for supporting rerouting of packets based on common node protection may be configured to support rerouting of source routed packets based on SR-Traffic Engineering (SR-TE). Various example embodiments for supporting rerouting of packets based on common node protection may be configured to support fast rerouting (FRR) of source routed packets based on SR-TE.

22 Claims, 9 Drawing Sheets

(51) Int. Cl.
*H04L 45/50* (2022.01)
*H04L 45/64* (2022.01)
*H04L 45/74* (2022.01)

(58) Field of Classification Search
USPC ....... 370/248, 252, 389, 392, 393, 397, 399, 370/409, 471, 474, 475
See application file for complete search history.

(56) References Cited

U.S. PATENT DOCUMENTS

| | | | |
|---|---|---|---|
| 10,020,984 B1 | 7/2018 | Jork et al. | |
| 10,536,324 B2 | 1/2020 | Wijnands et al. | |
| 2006/0159009 A1* | 7/2006 | Kim | H04L 45/00 370/216 |
| 2007/0127372 A1* | 6/2007 | Khan | H04L 67/327 370/395.21 |
| 2008/0025309 A1* | 1/2008 | Swallow | H04L 45/00 370/399 |
| 2008/0159301 A1* | 7/2008 | de Heer | H04L 12/4633 370/401 |
| 2009/0238084 A1* | 9/2009 | Nadeau | H04L 43/10 370/248 |
| 2009/0292942 A1* | 11/2009 | Bhat | H04L 43/0811 714/4.1 |
| 2009/0292943 A1* | 11/2009 | Hanif | H04L 45/22 714/4.1 |
| 2010/0106999 A1* | 4/2010 | Hanif | H04L 43/0811 714/4.1 |
| 2013/0010589 A1* | 1/2013 | Kini | H04L 45/50 370/219 |
| 2013/0336192 A1* | 12/2013 | Zhao | H04L 47/724 370/312 |
| 2014/0169370 A1 | 6/2014 | Filsfils et al. | |
| 2014/0330986 A1 | 11/2014 | Bowes et al. | |
| 2015/0117203 A1* | 4/2015 | Filsfils | H04L 12/66 370/235 |
| 2015/0256456 A1* | 9/2015 | Previdi | H04L 69/22 370/392 |
| 2016/0173366 A1* | 6/2016 | Saad | H04L 45/20 370/218 |
| 2016/0254987 A1 | 9/2016 | Eckert et al. | |
| 2016/0277290 A1* | 9/2016 | Sivabalan | H04L 47/825 |
| 2017/0005920 A1* | 1/2017 | Previdi | H04L 12/4633 |
| 2017/0222920 A1 | 8/2017 | Thubert | |
| 2017/0295089 A1* | 10/2017 | Saltsidis | H04L 47/41 |
| 2017/0346718 A1 | 11/2017 | Psenak | |
| 2018/0262440 A1* | 9/2018 | Sitaraman | H04L 47/728 |
| 2018/0367450 A1* | 12/2018 | Sitaraman | H04L 45/50 |
| 2019/0007372 A1* | 1/2019 | Bhat | H04L 61/3005 |
| 2019/0319876 A1 | 10/2019 | Gumaste et al. | |
| 2020/0014585 A1* | 1/2020 | Agarwal | H04L 49/25 |
| 2020/0344162 A1 | 10/2020 | Dutta | |
| 2020/0382416 A1* | 12/2020 | Hu | H04L 45/507 |
| 2020/0403861 A1* | 12/2020 | Saad | H04L 61/5007 |

OTHER PUBLICATIONS

Bashandy, A., et al., "Segment Routing with MPLS data plane," Internet Engineering Task Force (IETF), Network Working Group, draft-ietf-segment-routing-mpls-18, Dec. 9, 2018, 38 pages.
Filsfils, C., et al., "IPV5 Segment Routing Header (SRH)," Network Working Group, draft-ietf-6man-segment-routing-header-15, Oct. 22, 2018, 28 pages.
Information Sciences Institute, "Internet Protocol," DARPA Internet Program, Protocol Specification, RFC 791, Sep. 1981, 49 pages.
Atlas, A., et al., "Basic Specification for IP Fast Reroute: Loop-Free Alternates," Network Working Group, RFC 5286, Sep. 2008, 31 pages.
Bryant, S., et al., "Remote Loop-Free Alternate (LFA) Fast Reroute (FRR)," Internet Engineering Task Force, RFC 7490, Apr. 2015, 29 pages.
Francois, P., et al., "Topology Independent Fast Reroute using Segment Routing," Network Working Group, draft-francois-segment-routing-ti-lfa-00, Nov. 18, 2013, 10 pages.
Hedge, S., et al., "Node Protection for SR-TE Paths," draft-hedge-spring-node-protection-for-sr-te-paths-04, Routing Area, Oct. 17, 2018, 11 pages.
Iana, "Special-Purpose Multiprotocol Label Switching (MPLS) Label Values," https://www.iana.org/assignments/mpls-label-values/mpls-label-values.xhtml, printed on Sep. 19, 2019, 2 pages.
Iana, "IEEE 802 Numbers," https://www.iana.org/assignments/ieee-802-numbers/ieee-802-numbers.xhtml, printed on Sep. 19, 2019, 15 pages.
Iana, "DSCP Code Points," https://www.iana.org/assignments/dscp-registry/dscp-registry.xhtml, printed on Sep. 19, 2019, 3 pages.
Iana, "Assigned Internet Protocol Numbers," https://www.iana.org/assignments/protocol-numbers/protocol-numbers.xhtml, printed on Sep. 19, 2019, 10 pages.
Extended EP Search Report in corresponding EP 20196951.6 dated Dec. 9, 2020, 11 pages.

* cited by examiner

FIG. 2

| SID LOOKUP TABLE 210 | | | |
|---|---|---|---|
| SID | END OF SEGMENT | NEXT-HOP INDEX | BACKUP NEXT-HOP INDEX |
| L1 | NO | 1 | NONE |
| L2 | NO | SELF | NONE |
| L3 | NO | 2 | NONE |
| L4 | NO | 3 | NONE |
| L5 | NO | 2 | NONE |
| L6 | NO | 3 | 4 |
| L7 | NO | 3 | 4 |
| L8 | NO | 3 | 4 |
| L9 | NO | 3 | N4 |
| L21 | YES | 1 | NONE |
| L23 | YES | 2 | NONE |
| L24 | YES | 3 | NONE |
| L25 | YES | 4 | NONE |

| NEXT-HOP TABLE 220 | | | |
|---|---|---|---|
| NEXT-HOP INDEX | NEXT-HOP | NEIGHBOR | LINK PROTECTION DETOUR |
| 1 | R2->R1 | R1 | NONE |
| 2 | R2->R3 | R3 | {R2->R4, R4->R3} |
| 3 | R2->R4 | R4 | {R2->R3, R3->R4} |
| 4 | R2->R5 | R5 | {R2->R3, R3->R5} |

*FIG. 3*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Global MP Label Indicator        | Exp |0|      TTL      |
+-+-+-+-+-+-+-+-+-+-+-+-+-+-+-+-+-+-+-+-+-+-+-+-+-+-+-+-+-+-+-+-+
|            Global MP Label            | Exp |S|      TTL      |
+-+-+-+-+-+-+-+-+-+-+-+-+-+-+-+-+-+-+-+-+-+-+-+-+-+-+-+-+-+-+-+-+
```

*FIG. 5*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                 L24                   | Exp |0|      TTL      |
+-+-+-+-+-+-+-+-+-+-+-+-+-+-+-+-+-+-+-+-+-+-+-+-+-+-+-+-+-+-+-+-+
|                 L47                   | Exp |0|      TTL      |
+-+-+-+-+-+-+-+-+-+-+-+-+-+-+-+-+-+-+-+-+-+-+-+-+-+-+-+-+-+-+-+-+
|                 L79                   | Exp |0|      TTL      |
+-+-+-+-+-+-+-+-+-+-+-+-+-+-+-+-+-+-+-+-+-+-+-+-+-+-+-+-+-+-+-+-+
|                GMPLI                  | Exp |0|      TTL      |
+-+-+-+-+-+-+-+-+-+-+-+-+-+-+-+-+-+-+-+-+-+-+-+-+-+-+-+-+-+-+-+-+
|                 L9                    | Exp |S|      TTL      |
+-+-+-+-+-+-+-+-+-+-+-+-+-+-+-+-+-+-+-+-+-+-+-+-+-+-+-+-+-+-+-+-+
|                                                               |
~                                                               ~
//                          Payload                            //
//                                                             //
+-+-+-+-+-+-+-+-+-+-+-+-+-+-+-+-+-+-+-+-+-+-+-+-+-+-+-+-+-+-+-+-+
```

*FIG. 4A*     PSEUDOCODE 400 

Packet = The packet encapsulated with SR Label Stack. The labels are denoted as the array Packet->Label[]. The topmost label is Packet->Label[0].

Process_SR_Packet_With_Global_MP(Packet)
{
  // Index to the label in packet that we are currently processing.
  label_index_in_packet = 0;

// Lookup the top label of explicit path in SID Lookup Table
  SID_Entry = SID_Lookup_Table[Packet->Label[0]];

// If reached end of segment then pop te top label from stack.
  if (SID_Entry->End_Of_Segment)
  {
     Packet = Packet - Packet->Label[0];
  }

// Lookup the next-hop of the current label.
  Next_Hop_Entry = Next_Hop_Table[SID_Entry->Next_Hop_Index];

// If next-hop entry is not operational then try fast re-route, else use the next-hop entry.
  if (Next_Hop_Entry is not operational)
  {
     // If the next-hop link only failed and has next-hop has link protection detour then
     // use the detour, otherwise exercise the Global MP Option.
     if (Next_Hop_Entry's link only failed AND Next_Hop_Entry->Link_Protection_Detour)
     {
        // Lookup the first hop in the detour in SID lookup table.
        SID_Entry = SID_Lookup_Table[Next_Hop_Entry->Link_Protection_Detour->Label[0]];

// Push the labels from detour into the packet, except the first label/hop of the
        // detour.
        Packet = Packet + (All labels in Next_Hop_Entry->Link_Protection_Detour->Label[]
                    - Next_Hop_Entry->Link_Protection_Detour->Label[0]);

// The first hop of the detour is where we are sending the packet now.
        Next_Hop_Entry = Next_Hop_Table[SID_Entry->Next_Hop_Index];

FIG. 4B     PSEUDOCODE
400

```
    // If the detour failed too then drop the packet. It is possible that this next-hop may
    // have protection path too, but we only do one level of protection.
    if (Next_Hop_Entry is not operational)
    {
       goto drop_packet;
    }
}
// If has global MP then execute global node protection
else
{
    // Look for GMPLI in the label stack.
    Found_GMPL = 0;

for (index = 0;
        Packet->Label[index].Sbit == 0;
        index = index +1)
    {
      If (Packet->Label[index] is GMPLI)
      {
         Found_GMPL = Packet->Label[index + 1];
         break;
      }
    }

// If no GMPL then no node protection and do drop the packet.
    If (Found_GMPL == 0)
    {
       goto drop_packet;
    }

// Remove the explicit path label stack from the packet and GMPLI, so that
    // GMPL becomes the top label (and only label) in the explicit path.
    Packet = Packet − (All labels from Packet->Label[0] till Packet->Label[index];

// Now GMPL is at Packet->Label[0]. Lookup GMPL in SID Lookup Table
    SID_Entry = SID_Lookup_Table[Packet->Label[0]);

Next_Hop_Entry = Next_Hop_Table[SID_Entry->Next_Hop_Index];
```

*FIG. 4C*  PSEUDOCODE 400 

```
// If the next-hop for GMPL is not operational then see if GMPL has
// backup next-hop.
if (Next_Hop_Enry is not operational)
{
   if (SID_Entry->Backup_Next_Hop_index)
   {
      Next_Hop_Entry = Next_Hop_Table[SID_Entry->Backup_Next_Hop_Index];

if (Next_Hop_Entry is not operational)
      {
         goto drop_packet;
      }
   }
  }
 }
}

// Add the Layer-2 header for the next-hop onto the packet.
Packet = {Layer-2 header for Next_Hop_Entry->Next_Hop} + Packet;

// Send the packet to next-hop.
Send (Packet, Next_Hop_Entry->Next_Hop);

drop_packet:
   Return;
}
```

*FIG. 6*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              L47                  | Exp |0|      TTL          |
+-+-+-+-+-+-+-+-+-+-+-+-+-+-+-+-+-+-+-+-+-+-+-+-+-+-+-+-+-+-+-+-+
|              L79                  | Exp |0|      TTL          |
+-+-+-+-+-+-+-+-+-+-+-+-+-+-+-+-+-+-+-+-+-+-+-+-+-+-+-+-+-+-+-+-|
|             GMPLI                 | Exp |0|      TTL          |
+-+-+-+-+-+-+-+-+-+-+-+-+-+-+-+-+-+-+-+-+-+-+-+-+-+-+-+-+-+-+-+-+
|              L9                   | Exp |S|      TTL          |
+-+-+-+-+-+-+-+-+-+-+-+-+-+-+-+-+-+-+-+-+-+-+-+-+-+-+-+-+-+-+-+-+
|                                                               |
~                                                               ~
//                          Payload                            //
//                                                             //
+-+-+-+-+-+-+-+-+-+-+-+-+-+-+-+-+-+-+-+-+-+-+-+-+-+-+-+-+-+-+-+-+
```

*FIG. 7*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              L9                   | Exp |S|      TTL          |
+-+-+-+-+-+-+-+-+-+-+-+-+-+-+-+-+-+-+-+-+-+-+-+-+-+-+-+-+-+-+-+-+
|                                                               |
~                                                               ~
//                          Payload                            //
//                                                             //
+-+-+-+-+-+-+-+-+-+-+-+-+-+-+-+-+-+-+-+-+-+-+-+-+-+-+-+-+-+-+-+-+
```

PACKET ROUTING BASED ON COMMON NODE PROTECTION

TECHNICAL FIELD

Various example embodiments relate generally to communication systems and, more particularly but not exclusively, to routing of source routed packets in communication networks.

BACKGROUND

In many communication networks, various communications technologies may be used to support communications.

SUMMARY

In at least some example embodiments, an apparatus includes at least one processor and at least one memory including program code, wherein the at least one memory and the program code are configured to, with the at least one processor, cause the apparatus to at least handle a packet including a header and a payload, wherein the header includes an encoding of a set of hops of a path for the packet, wherein the header includes an encoding of a common merge point configured to support rerouting of the packet based on a failure on the path. In at least some example embodiments, the packet includes a source routed packet. In at least some example embodiments, the common merge point is a node of the path where a protection path, which is used to reroute the packet based on the failure on the path, merges back with the path. In at least some example embodiments, the common merge point is an endpoint of a protection path used by a node of the path that operates as a point of local repair for rerouting the packet based on the failure on the path. In at least some example embodiments, the path includes a set of transit nodes, wherein the common merge point is configured for use by at least a portion of the transit nodes of the path for rerouting the packet based on the failure on the path. In at least some example embodiments, common merge point is configured for use by multiple of the transit nodes of the path for rerouting the packet based on the failure on the path. In at least some example embodiments, the common merge point is configured for use by each of the transit nodes of the path for rerouting the packet based on the failure on the path. In at least some example embodiments, the path includes a set of nodes including an ingress node and an egress node, wherein the common merge point is the egress node. In at least some example embodiments, the encoding of the set of hops of the path includes the encoding of the common merge point. In at least some example embodiments, the encoding of the common merge point includes an identifier of the common merge point. In at least some example embodiments, the packet is based on a Multiprotocol Label Switching (MPLS) protocol. In at least some example embodiments, the encoding of the common merge point includes an MPLS label identifying the common merge point. In at least some example embodiments, the encoding of the common merge point includes a label including the encoding of the common merge point and a label indicator configured to indicate a presence of the label including the encoding of the common merge point. In at least some example embodiments, the encoding of the common merge point includes a segment identifier (SID) of the common merge point. In at least some example embodiments, the packet is based on an Internet Protocol (IP) protocol. In at least some example embodiments, the encoding of the common merge point includes an IP address of the common merge point. In at least some example embodiments, to handle the packet, the at least one memory and the program code are configured to, with the at least one processor, cause the apparatus to at least generate the packet at an ingress node of the path and send the packet from the ingress node toward a next-hop node of the path. In at least some example embodiments, to handle the packet, the at least one memory and the program code are configured to, with the at least one processor, cause the apparatus to at least receive the packet at a transit node of the path, determine, based on the encoding of the set of hops of the path, a next-hop node of the path, and forward the packet toward the next-hop node of the path based on a determination that the next-hop node of the path is reachable along the path. In at least some example embodiments, to handle the packet, the at least one memory and the program code are configured to, with the at least one processor, cause the apparatus to at least receive the packet at a transit node of the path, determine, based on the encoding of the set of hops of the path, a next-hop node of the path, and initiate, based on a determination that the next-hop node of the path is unreachable along the path, rerouting of the packet from the transit node toward the egress node via a protection path based on the common merge point. In at least some example embodiments, to initiate rerouting of the packet from the transit node toward the egress node, the at least one memory and the program code are configured to, with the at least one processor, cause the apparatus to at least modify the packet, including removing from the header the encoding of the path and configuring the packet based on use of the common merge point as an endpoint of the protection path, to form a modified packet and send the modified packet from the transit node toward a next-hop node of the protection path. In at least some example embodiments, the protection path is a loose path. In at least some example embodiments, to handle the packet, the at least one memory and the program code are configured to, with the at least one processor, cause the apparatus to at least receive the packet at an egress node of the path and forward the payload of the packet.

In at least some example embodiments, a non-transitory computer-readable medium includes instructions configured to cause an apparatus to at least handle a packet including a header and a payload, wherein the header includes an encoding of a set of hops of a path for the packet, wherein the header includes an encoding of a common merge point configured to support rerouting of the packet based on a failure on the path. In at least some example embodiments, the packet includes a source routed packet. In at least some example embodiments, the common merge point is a node of the path where a protection path, which is used to reroute the packet based on the failure on the path, merges back with the path. In at least some example embodiments, the common merge point is an endpoint of a protection path used by a node of the path that operates as a point of local repair for rerouting the packet based on the failure on the path. In at least some example embodiments, the path includes a set of transit nodes, wherein the common merge point is configured for use by at least a portion of the transit nodes of the path for rerouting the packet based on the failure on the path. In at least some example embodiments, common merge point is configured for use by multiple of the transit nodes of the path for rerouting the packet based on the failure on the path. In at least some example embodiments, the common merge point is configured for use by each of the transit nodes of the path for rerouting the packet based on the failure on the path. In at least some example embodiments, the path includes a set of nodes including an ingress node and an egress node, wherein the common merge point is the egress node. In at least some example embodiments, the encoding of the set of hops of the path includes the encoding of the common merge point. In at least some example embodiments, the encoding of the common merge point includes an identifier of the common merge point. In at least some example embodiments, the packet is based on a Multiprotocol Label Switching (MPLS) protocol. In at least some example embodiments, the encoding of the common merge point includes an MPLS label identifying the common merge point. In at least some example embodiments, the encoding of the common merge point includes a label including the encoding of the common merge point and a label indicator configured to indicate a presence of the label including the encoding of the common merge point. In at least some example embodiments, the encoding of the common merge point includes a segment identifier (SID) of the common merge point. In at least some example embodiments, the packet is based on an Internet Protocol (IP) protocol. In at least some example embodiments, the encoding of the common merge point includes an IP address of the common merge point. In at least some example embodiments, to handle the packet, the non-transitory computer-readable medium includes instructions configured to cause the apparatus to at least generate the packet at an ingress node of the path and send the packet from the ingress node toward a next-hop node of the path. In at least some example embodiments, to handle the packet, the non-transitory computer-readable medium includes instructions configured to cause the apparatus to at least receive the packet at a transit node of the path, determine, based on the encoding of the set of hops of the path, a next-hop node of the path, and forward the packet toward the next-hop node of the path based on a determination that the next-hop node of the path is reachable along the path. In at least some example embodiments, to handle the packet, the non-transitory computer-readable medium includes instructions configured to cause the apparatus to at least receive the packet at a transit node of the path, determine, based on the encoding of the set of hops of the path, a next-hop node of the path, and initiate, based on a determination that the next-hop node of the path is unreachable along the path, rerouting of the packet from the transit node toward the egress node via a protection path based on the common merge point. In at least some example embodiments, to initiate rerouting of the packet from the transit node toward the egress node, the non-transitory computer-readable medium includes instructions configured to cause the apparatus to at least modify the packet, including removing from the header the encoding of the path and configuring the packet based on use of the common merge point as an endpoint of the protection path, to form a modified packet and send the modified packet from the transit node toward a next-hop node of the protection path. In at least some example embodiments, the protection path is a loose path. In at least some example embodiments, to handle the packet, the non-transitory computer-readable medium includes instructions configured to cause the apparatus to at least receive the packet at an egress node of the path and forward the payload of the packet.

In at least some example embodiments, a method includes handling a packet including a header and a payload, wherein the header includes an encoding of a set of hops of a path for the packet, wherein the header includes an encoding of a common merge point configured to support rerouting of the packet based on a failure on the path. In at least some example embodiments, the packet includes a source routed packet. In at least some example embodiments, the common merge point is a node of the path where a protection path, which is used to reroute the packet based on the failure on the path, merges back with the path. In at least some example embodiments, the common merge point is an endpoint of a protection path used by a node of the path that operates as a point of local repair for rerouting the packet based on the failure on the path. In at least some example embodiments, the path includes a set of transit nodes, wherein the common merge point is configured for use by at least a portion of the transit nodes of the path for rerouting the packet based on the failure on the path. In at least some example embodiments, common merge point is configured for use by multiple of the transit nodes of the path for rerouting the packet based on the failure on the path. In at least some example embodiments, the common merge point is configured for use by each of the transit nodes of the path for rerouting the packet based on the failure on the path. In at least some example embodiments, the path includes a set of nodes including an ingress node and an egress node, wherein the common merge point is the egress node. In at least some example embodiments, the encoding of the set of hops of the path includes the encoding of the common merge point. In at least some example embodiments, the encoding of the common merge point includes an identifier of the common merge point. In at least some example embodiments, the packet is based on a Multiprotocol Label Switching (MPLS) protocol. In at least some example embodiments, the encoding of the common merge point includes an MPLS label identifying the common merge point. In at least some example embodiments, the encoding of the common merge point includes a label including the encoding of the common merge point and a label indicator configured to indicate a presence of the label including the encoding of the common merge point. In at least some example embodiments, the encoding of the common merge point includes a segment identifier (SID) of the common merge point. In at least some example embodiments, the packet is based on an Internet Protocol (IP) protocol. In at least some example embodiments, the encoding of the common merge point includes an IP address of the common merge point. In at least some example embodiments, handling the packet includes generating the packet at an ingress node of the path and sending the packet from the ingress node toward a next-hop node of the path. In at least some example embodiments, handling the packet includes receiving the packet at a transit node of the path, determining, based on the encoding of the set of hops of the path, a next-hop node of the path, and forwarding the packet toward the next-hop node of the path based on a determination that the next-hop node of the path is reachable along the path. In at least some example embodiments, handling the packet includes receiving the packet at a transit node of the path, determining, based on the encoding of the set of hops of the path, a next-hop node of the path, and initiating, based on a determination that the next-hop node of the path is unreachable along the path, rerouting of the packet from the transit node toward the egress node via a protection path based on the common merge point. In at least some example embodiments, initiating rerouting of the packet from the transit node toward the egress node includes modifying the packet, including removing from the header the encoding of the path and configuring the packet based on use of the common merge point as an endpoint of the protection path, to form a modified packet and sending the modified packet from the transit node toward a next-hop node of the protection path. In at least some example embodiments, the protection path is a loose path. In at least some example embodiments, handling the packet includes receiving the packet at an egress node of the path and forwarding the payload of the packet. In at least some example embodiments, an apparatus includes means for handling a packet including a header and a payload, wherein the header includes an encoding of a set of hops of a path for the packet, wherein the header includes an encoding of a common merge point configured to support rerouting of the packet based on a failure on the path. In at least some example embodiments, the packet includes a source routed packet. In at least some example embodiments, the common merge point is a node of the path where a protection path, which is used to reroute the packet based on the failure on the path, merges back with the path. In at least some example embodiments, the common merge point is an endpoint of a protection path used by a node of the path that operates as a point of local repair for rerouting the packet based on the failure on the path. In at least some example embodiments, the path includes a set of transit nodes, wherein the common merge point is configured for use by at least a portion of the transit nodes of the path for rerouting the packet based on the failure on the path. In at least some example embodiments, common merge point is configured for use by multiple of the transit nodes of the path for rerouting the packet based on the failure on the path. In at least some example embodiments, the common merge point is configured for use by each of the transit nodes of the path for rerouting the packet based on the failure on the path. In at least some example embodiments, the path includes a set of nodes including an ingress node and an egress node, wherein the common merge point is the egress node. In at least some example embodiments, the encoding of the set of hops of the path includes the encoding of the common merge point. In at least some example embodiments, the encoding of the common merge point includes an identifier of the common merge point. In at least some example embodiments, the packet is based on a Multiprotocol Label Switching (MPLS) protocol. In at least some example embodiments, the encoding of the common merge point includes an MPLS label identifying the common merge point. In at least some example embodiments, the encoding of the common merge point includes a label including the encoding of the common merge point and a label indicator configured to indicate a presence of the label including the encoding of the common merge point. In at least some example embodiments, the encoding of the common merge point includes a segment identifier (SID) of the common merge point. In at least some example embodiments, the packet is based on an Internet Protocol (IP) protocol. In at least some example embodiments, the encoding of the common merge point includes an IP address of the common merge point. In at least some example embodiments, the means for handling the packet includes means for generating the packet at an ingress node of the path and means for sending the packet from the ingress node toward a next-hop node of the path. In at least some example embodiments, the means for handling the packet includes means for receiving the packet at a transit node of the path, means for determining, based on the encoding of the set of hops of the path, a next-hop node of the path, and means for forwarding the packet toward the next-hop node of the path based on a determination that the next-hop node of the path is reachable along the path. In at least some example embodiments, the means for handling the packet includes means for receiving the packet at a transit node of the path, means for determining, based on the encoding of the set of hops of the path, a next-hop node of the path, and means for initiating, based on a determination that the next-hop node of the path is unreachable along the path, rerouting of the packet from the transit node toward the egress node via a protection path based on the common merge point. In at least some example embodiments, the means for initiating rerouting of the packet from the transit node toward the egress node includes means for modifying the packet, including means for removing from the header the encoding of the path and configuring the packet based on use of the common merge point as an endpoint of the protection path, to form a modified packet and means for sending the modified packet from the transit node toward a next-hop node of the protection path. In at least some example embodiments, the protection path is a loose path. In at least some example embodiments, the means for handling the packet includes means for receiving the packet at an egress node of the path and means for forwarding the payload of the packet.

BRIEF DESCRIPTION OF THE DRAWINGS

The teachings herein can be readily understood by considering the following detailed description in conjunction with the accompanying drawings, in which:

FIG. 2 depicts an example embodiment of router forwarding state configured to support fast rerouting of source routed packets based on global node protection;

FIG. 3 depicts an example embodiment of a stack of labels configured to support fast rerouting of source routed packets based on global node protection in an MPLS dataplane;

FIGS. 4A-4C depict an example embodiment of pseudocode for processing an SR packet based on global node protection in an MPLS dataplane;

FIG. 5 depicts an example embodiment of an SR packet, encoded by an ingress router of an explicit path for the SR packet, based on use of global node protection in an MPLS dataplane;

FIG. 6 depicts a modified version of the SR packet of FIG. 5, based on processing of the SR packet by a transit router of the explicit path, where global node protection is not applied for routing the packet from the transit router;

FIG. 7 depicts a modified version of the SR packet of FIG. 5, based on processing of the SR packet by a transit router of the explicit path, where global node protection is applied for routing the packet from the transit router;

To facilitate understanding, identical reference numerals have been used, where possible, to designate identical elements that are common to the figures.

DETAILED DESCRIPTION

Figure 1:
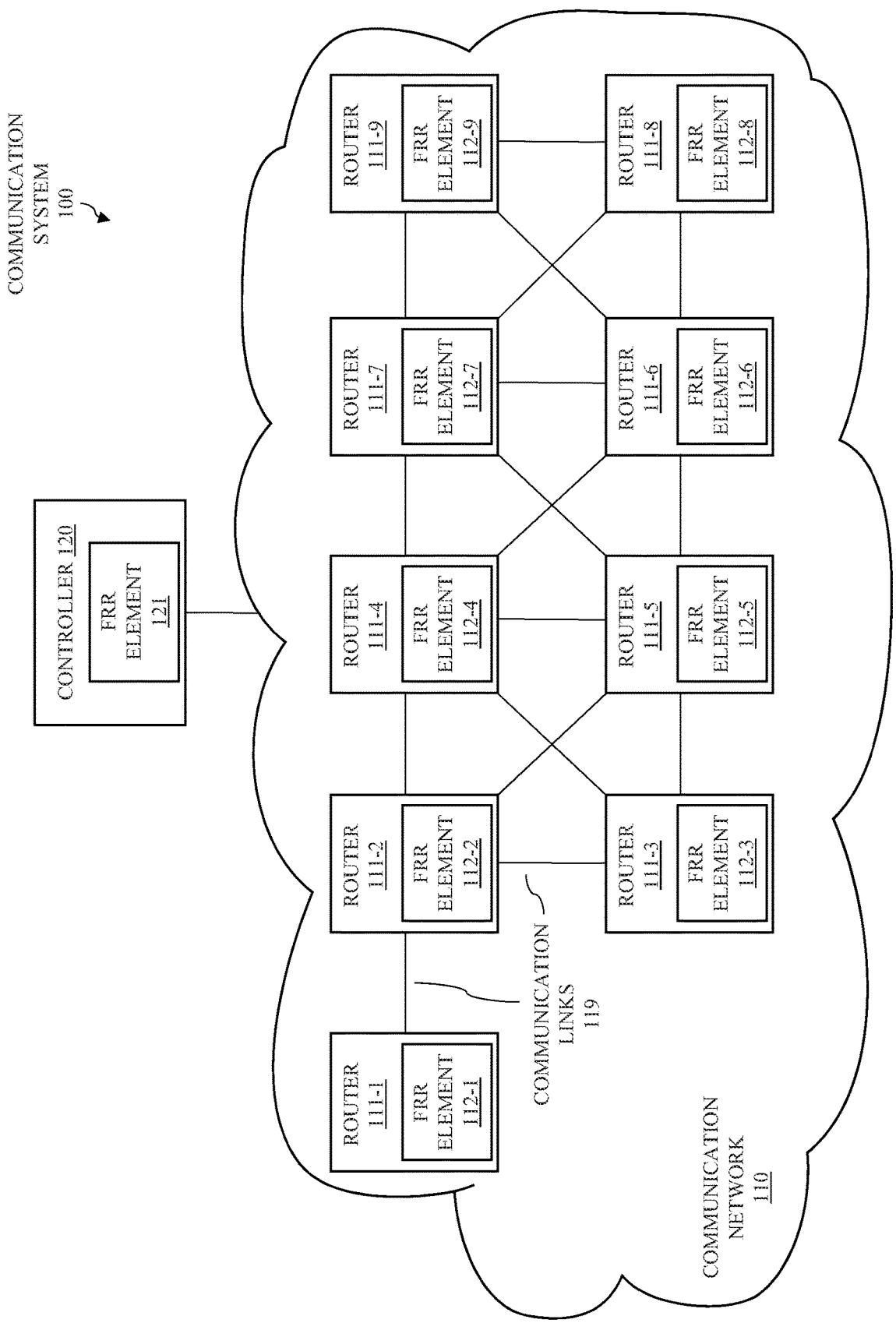
FIG. 1 depicts an example embodiment of a communication system configured to support fast rerouting of source routed packets based on global node protection.

Various example embodiments for supporting rerouting of packets in communication networks are presented. Various example embodiments for supporting rerouting of packets in communication networks may be configured to support rerouting of packets based on common node protection. Various example embodiments for supporting rerouting of packets in communication networks may be configured to support rerouting of a source routed packet, to be routed along a path encoded within the source routed packet, based on common node protection, where common node protection may be provided to protect a subset of the transit nodes of nodes of the path or may be provided to protect each of the transit nodes of the path (in which case common node protection may be referred to as global node protection since it provides global protection for each of the transit nodes of the path). Various example embodiments for supporting rerouting of a source routed packet based on common node protection may be configured to provide common node protection for the source routed packet by including within the source routed packet an encoding of a set of hops of a path for the source routed packet and an encoding of a common merge point configured to support rerouting of the source routed packet based on a failure on the path. The common merge point is a node of the path where a protection path, used to reroute the source routed packet based on the failure on the path, merges back with the path or, stated differently, is an endpoint for a protection path used by a node of the path that operates as a point of local repair for rerouting the source routed packet based on the failure on the path. The common merge point may be used to protect any portion of the path of the source routed packet. The common merge point, in the case in which only a portion of the path is protected, may be any node along the path depending on the portion of the path to be protected (e.g., the end node of the portion of the path to be protected, which may or may not be the egress node of the path). The common merge point, in the case of global node protection, may be the egress node of the path. Various example embodiments for supporting rerouting of a source routed packet based on common node protection may be configured to provide multiple instances of common node protection for the source routed packet by including within the source routed packet multiple encodings of multiple common merge points configured to protect multiple portions of the path for the source routed packet, respectively. Various example embodiments for supporting rerouting of source routed packets based on common node protection may be configured to support rerouting of source routed packets in packet switched networks. Various example embodiments for supporting rerouting of source routed packets based on common node protection may be configured to support rerouting of source routed packets that are based on segment routing (SR). Various example embodiments for supporting rerouting of source routed packets based on common node protection may be configured to support rerouting of source routed packets based on SR-Traffic Engineering (SR-TE). Various example embodiments for supporting rerouting of source routed packets based on common node protection may be configured to support fast rerouting (FRR) of source routed packets based on SR-TE. It will be appreciated that various aspects of various example embodiments for supporting rerouting of source routed packets based on common node protection may vary depending on the underlying technology of the packet switched network. It will be appreciated that these and various other example embodiments and advantages or potential advantages of supporting rerouting of source routed packets based on common node protection may be further understood by way of reference to the various figures, which are discussed further below. It is noted that, for purposes of clarity in describing various aspects of various example embodiments for supporting rerouting of source routed packets based on common node protection, various example embodiments for supporting rerouting of source routed packets based on common node protection are primarily presented herein within the context of example embodiments in which common node protection is provided based on use of a global merge point (and, thus, in which common node protection may be considered to be global node protection); however, as discussed further herein, it will be appreciated that such example embodiments may be applied or adapted for use to provide various example embodiments for supporting rerouting of source routed packets based on the more general common node protection which can protect any portion of the paths of the source routed packets.

FIG. 1 depicts an example embodiment of a communication system configured to support fast rerouting of source routed packets based on global node protection;

The communication system 100 includes a communication network 110 and a controller 120. The communication network 110 is a packet-switched network including a set of routers 111-1-111-9 (collectively, routers 111, which are also referred to herein using the notation Rx) and a set of communication links 119 via which the routers 111 are communicatively connected. The communication network 110 is configured to support various data plane functions and various control plane functions for supporting communication of traffic based on source routing. The controller 120 is configured to provide control functions for the communication network 110 (e.g., computing and installing routes within communication network 110, performing monitoring and rerouting functions for communication network 110, or the like, as well as various combinations thereof). The communication system 100 is configured to support various embodiments for supporting rerouting of packets within the communication network 110 based on use of global node protection. Various embodiments for supporting rerouting of packets within the communication network 110 based on use of global node protection may be further understood by first considering various aspects of communication networks.

In general, many packet-switched networks, such as communication network 110, are built on mesh topologies in which there are multiple paths available to reach a given destination. The links in the mesh topology are point-to-point links between routers (illustratively, communication links 119 between routers 111). In general, a path to a destination may go through any number of routers 111, and the path may change at any time due to various conditions (e.g., traffic problems, failed links, failed nodes, or the like). In this type of environment, there are generally at least two possible packet-routing methods available: hop-by-hop destination-based routing and source routing.

In hop-by-hop destination-based routing, a packet has a source address (SA) and a destination address (DA) and, at each router along the route, the router checks the DA and makes a routing decision as to how to forward the packet based on the DA. Thus, decisions are made on a hop-by-hop basis in the network until the packet reaches its destination. In other words, this scheme is similar to getting directions along the way.

In source routing, also called explicit path addressing, a head-end router may partially or completely specify the route that the packet takes through the network. The head-end router discovers an explicit path for a packet flow through the network (e.g., locally or based on interaction with a controller) in advance of sending packets of the packet flow. The explicit path is "encoded" into the packet and transit routers forward the packet based on that explicit path. In general, as discussed further below, source routing may use a loose source route, a strict source route, or a combination thereof.

In general, source routing, as compared with hop-by-hop destination-based routing, reduces the states needed in transit nodes in order for the transit nodes to forward a packet, since each transit node typically maintains forwarding information to next-hop nodes (rather than maintaining forwarding information to each possible packet destination, as in hop-by-hop destination-based routing). A generic method of source routing is explained below with respect to FIG. 1.

In FIG. 1, R1 (the head-end router) decides to send a packet along the path R1-R2-R4-R7-R9. In this example, assume that R1, R2, R3 . . . , R9 are loopback addresses assigned as node/router identifiers. For example, in the IPv4 addressing scheme, R9 may be something like 1.1.1.1. So R1 encodes the explicit path with node identifiers as {R4, R7, R9} into the packet and sends the packet to R2. When R2 receives the packet, it reads and pops the first hop in the explicit path, which is R4, and then forwards the packet to R4 with the explicit path in the packet as {R7, R9}. When R4 receives the packet, it reads and pops the first hop in the explicit path, which is R7, and forwards the packet to R7 with the explicit path {R9}. When R7 receives the packet, it reads and pops the first hop, which is R9, and forwards the packet to R9 without any explicit path. The packet may then be forwarded by destination based routing at R9 and onwards toward the ultimate destination for the packet.

As indicated above, source routing may use a loose source route, in which an intermediate router can choose among multiple paths to reach a specified next hop. For example, if R2 finds that the "optimal" path to R4 is via R2-R3-R4, instead of R3-R4 specified in the packet, then it will not pop R4 from the explicit path and would forward the packet to R3 with the explicit path {R4, R7, R8}. When R3 receives the packet and finds the first hop in the path as R4, it pops R4 since R4 is the immediate next-hop for the packet and sends the packet to R4 with the explicit path {R7, R8}. In other words, when an explicit path includes one or more node identifiers then it may be considered a loose source route since a transit router, for a given node, can choose one among the available paths to reach the specified node (which is a loopback address of the node).

As indicated above, source routing may use a strict source route, in which the head-end router specifies the exact set of links to be taken by the packet. For example, R1 encodes a set of next-hop identifiers such as {R2→R4, R4→R7, R7→R9} to specify the path to be taken by the packet. A next-hop identifier can be represented by the next-hop address on a link. For example, R2→R4 can be encoded as the IP address on R2-R4 link at the R4 end (conversely, R4→R2 means the IP address on R2-R4 link at the R2 end). Using the IPv4 addressing scheme, it is possible to encode something like R2→R4=10.10.10.2 and R4→R2=10.10.10.1, where the R2-R4 link is assigned the subnet 10.10.10.1/30. It is noted that use of a strict source route may be preferable when a packet belonging to a service or application needs to meet strict QoS requirements or SLAs and, thus, needs to follow a strict path with links satisfying the QoS requirements or SLAs.

It is noted that source routing may use a combination of strict source routes and loose source routes. For example, R1 can specify a mix of strict and loose hops such as {R2→R4, R9}. Here, the packet must traverse the R2→R4 next-hop to reach R4, but R4 may choose one of the available paths between R4 and R9.

A variant of strict source routing with constraints is called constraint-based source routing (CBSR), which generally works as follows. The network includes network elements (e.g., nodes and links) that are arranged in a topology. Various Traffic Engineering (TE) parameters are assigned into the network elements. For example, the TE parameters of a network element may describe characteristics such as cost, delay, throughput, available bandwidth, packet loss, or the like, as well as various combinations thereof. The topology and TE parameters of the network elements are learned by a path computation element (PCE) and are maintained in a centralized traffic engineering (TE) database (TEDB) hosted by the PCE. For example, the PCE may be an external agent such as an SDN controller, a server, or the like. The PCE can learn the topology and TE parameters by listening to link-state advertisements (LSAs) from one or more Interior Gateway Protocols (IGPs) (e.g., Intermediate System to Intermediate System (IS-IS), Open Shortest Path First (OSPF), OSPF version 3 (OSPFv3), or the like) running among the routers, by using a Border Gateway Protocol (BGP) (e.g., BGP-Link State (BGP-LS), e.g., as defined in RFC 7752, or the like), by using a push/pull mechanism to gather such information from the routers, or the like, as well as various combinations thereof. The head-end router classifies packets into flows based on an application or a service, where each flow may be associated with a specific QoS requirement or SLA. The head-end router sends a request to the PCE for the PCE to compute an explicit path (typically the optimal path) that meets specified QoS requirements or SLA. The PCE typically computes such a path by running a Constraint Shortest Path First (CSPF) process based on the TEDB. Once a path is allocated, the PCE updates the dynamic TE state (e.g., residual bandwidth) of the network elements along that path into the TEDB to reflect that TE resources allocated to the path have been reserved. The head-end router sends all packets belonging to a flow over the explicit path that meets the QoS requirement/SLA of the flow. The explicit path is encoded into the packet. Thus, it is possible that packets of different flows to the same destination follow diverse paths. It is noted that, since per flow states are maintained at the head-end router only, and the transit routers are agnostic of a flow (including the associated QoS requirement/SLA of the flow), this results in significant reduction of cost and complexity at the transit routers.

Source routing techniques may be used in conjunction with various different communication protocols. For example, as discussed further below, source routing techniques may be used in conjunction with MPLS (MPLS-based source routing), Ipv4 (Ipv4 source routing), Ipv6 (Ipv6 source routing), or the like, as well as various combinations thereof.

Segment Routing (SR) has been recently proposed as an innovative technique to provide traffic engineering (TE) by simplifying control plane operations. For example, this has been proposed in RFC 8402. SR relies on the source routing paradigm and can be deployed in packet switched networks supporting MPLS or IPv6. In SR, the loopback address of a router is referred to as a "Prefix Segment" and the next-hop adjacency between two routers is referred to as an "Adjacency Segment". Each segment is assigned a Segment Identifier (SID), which is encoded into an explicit path to identify the segment. SR using an MPLS dataplane is described in the "Segment Routing with MPLS data plane" document (see, e.g., https://tools.ietforg/html/draft-ietf-spring-segment-routing-mpls-18) and SR using an IPv6 dataplane is described in the "Ipv6 Segment Routing Header (SRH)" document (see, e.g., https://tools.ietf.org/html/draft-ietf-6man-segment-routing-header-15). It is noted that there is no explicit specification for SR using an IPv4 dataplane, since SR uses the IPv4 source routing described in the base IPv4 specification (RFC 791).

In SR using an MPLS dataplane, packet flows are enforced through a specific path by applying, at the ingress/head-end node, a specifically designed stack of segment identifiers (SIDs) fully compatible with the MPLS data plane. The stack of SIDs is referred to as a segment list and corresponds to the stack of labels in the MPLS architecture. The ingress/head-end router sends a packet with the list of SIDs (stack of labels) where each SID indicates a next-hop, or router, to be traversed by the packet. Only the top SID in the list is processed during packet forwarding by transit nodes. Each packet is forwarded along the shortest path toward the network element represented by the top SID. A prefix-SID represents a Prefix Segment. For instance, a prefix-SID can represent an ECMP-aware shortest-path to an Interior Gateway Protocol prefix (i.e., IGP-Prefix) which identifies a specific router (i.e., IGP-Node Segment). An adjacency-SID represents a hop over a specific adjacency between two nodes in the IGP (i.e., IGP-Adjacency Segment). A Prefix Segment is typically a multi-hop path while an Adjacency Segment, in most cases, is a one-hop path. Unlike traditional MPLS networks, SR maintains per-flow state only at the ingress node, where the segment list is applied. As such, no signaling protocol (e.g., Resource Reservation Protocol with traffic engineering extensions—RSVP-TE) is required to populate the forwarding table of transit nodes. In this way, a simplified control plane is employed by just relying on the IGP that is properly extended to advertise SIDs as additional attributes of LSAs and, further, scalability of transit nodes is greatly improved since MPLS Label Switch Path (LSP) state information is not required.

In SR using an IPv6 dataplane, as in SR using an MPLS dataplane, packet flows are enforced through a specific path by applying, at the ingress/head-end node, a specifically designed stack of SIDs fully compatible with the IPv6 data plane. In other words, in SR using an IPv6 dataplane, the SIDs are encoded into the packet as IPv6 addresses that are assigned to Adjacency Segments or Node Segments.

It will be appreciated that, although various embodiments for supporting rerouting of packets based on global node protection may be utilized for any form of dataplane in SR (e.g., MPLS, IPv4, IPv6, or the like), various embodiments for supporting rerouting of packets based on global node protection, for purposes of clarity, are primarily presented herein within the context of rerouting of packets in an MPLS-based dataplane. Accordingly, various embodiments for supporting rerouting of packets based on global node protection may be further understood by first considering an example based on FIG. 1.

In FIG. 1, consider a flow A from head-end router R1 to egress router R9 that follows a strict source route on the following strict explicit path: {R1→R2, R2→R4, R4→R7, R7→R9}. In this example, let the Prefix-SID of router Rx be denoted with the MPLS label Lx. For example, the Prefix-SID for R7 is L7, and so forth. Similarly, in this example, let the Adjacency-SID for Rx→Ry be denoted with MPLS label Lxy. For example, the Adjacency-SID for R2→R4 is L24, and so forth. In this example, assume that SR-specific forwarding plane states for processing SR/SR-TE packet exist in each of the routers R1-R9. The SIDs/labels may be programmed into an SID lookup table (which, in the MPLS data plane, also may be the Incoming Label Map (ILM)). In each of the routers, all of the Prefix-SIDs in the network (e.g., L1-L9) may be programmed, but only Adjacency-SIDs that are locally connected to a given router Rx are programmed (e.g., for router R2, only Adjacency-SIDs that are locally connected to R2—namely, L21, L23, L24, and L25—are programmed). Since multiple SIDs may share a common next-hop, the Next-Hop Table of a router Rx will include the entries for forwarding packets to unique next-hops of Rx. An entry in the SID Lookup Table points to its corresponding entry in Next-Hop Table and also indicates whether the SID identifies an Adjacency Segment (end of the segment) or a Prefix Segment (not the end of the segment). In this example, R1 sends a packet for flow A to R1→R2 with the label stack in the packet as {L24, L47, L79}. It is noted that SID L12 for the first hop R12 in the explicit path is not encoded into the label stack since it is the Adjacency-SID of R1. When R2 receives the packet, it looks up the top label L24 in its SID Lookup Table, which points to an entry in its Next-Hop Table that identifies the next-hop R2→R4. Since L24 is end of the segment, R2 pops L24 from the packet. R2 sends the packet to R2→R4 with the label stack {L47, L79}. When R4 receives the packet, it pops the top label L47 since the segment ends at R4. Lookup of L47 by R7 results in next-hop R4→R7. So, R4 sends the packet over R4→R7 with label stack {L79}. When R7 receives the packet, the top label L79 results in next-hop R7→R9. Since L79 ends in R7, R7 pops the label and sends the packet to R9 without any label stack. When R9 receives the packet, it processes the packet based on the underlying native header(s).

In source routing, Fast Reroute (FRR) may be used to provide resiliency against various types of failures which may impact delivery of packets routed using source routing. In general, FRR is a mechanism for protecting traffic from link failures or node failures by locally repairing or rerouting traffic at a point of local repair (PLR), thereby allowing continuity of the impacted flows until the source node starts sending packets over the alternate path computed by the PCE. The use of FRR may be further understood by way of reference to an example based on FIG. 1. In FIG. 1, assume that R1 is sending packets for two flows to R9 as follows: flow A with the strict path {R1→R2, R2→R4, R4→R7, R7→R9} and flow B with the strict path {R1→R2, R2→R4, R4→R6, R6→R8, R8→R9}. R1 would send SR-TE packets of each flow by encoding the list of adjacency SIDs that represent the segments in its strict path. For flow A, R1 sends SR-TE packets by encoding the label stack {L24, L47, L79} into the packets. For flow B, R1 sends SR-TE packets by encoding the label stack {L24, L46, L68, L89} into the packets. If the R2→R4 link fails or the R4 node fails, then it could take several seconds to propagate the failure to the PCE, after which an alternate end-to-end path is re-computed by the PCE and R1 is notified of the alternate path so that R1 can begin sending packets over the alternate path. However, since a source routing paradigm is used to provide strict QoS requirement or SLA guarantees of an application or service (translated into flows), R2 should be able to "locally" re-route traffic of a flow around the failure (local repair), until the alternate path is re-computed by the PCE (global repair). As indicated above, this type of local rerouting may be provided using FRR.

In general, and as indicated above, FRR is a mechanism for protecting traffic from link failures or node failures by locally repairing or rerouting traffic at a PLR, thereby allowing continuity of the impacted flows until the source node starts sending packets over the alternate path computed by the PCE. In the example above, as indicated above, R2 would be the PLR which would apply FRR to protect the traffic from the failure (namely, when the R2→R4 link fails or the R4 node fails). For example, link protection for the R2→R4 link could be provided using the path R2→R3→R4. For example, node protection for R4 could be provided using the path R2→R3→R5→R7. It is noted that, in FRR, a PLR node typically is supposed to guarantee re-routing of traffic within 0-50 milliseconds (typically referred to as "sub-50 ms"), which is generally significantly faster than the time it takes for the PCE to re-compute an alternate path and to notify the head-end node of the alternate path. In general, FRR mechanisms are typically based on the principles of FRR computation, FRR programming, and FRR forwarding, each of which is discussed further below.

As indicated above, FRR is typically based on FRR computation. For each PLR, a protection path against a next-hop node or adjacency is precomputed for resiliency against failure of that next-hop or adjacency. A protection path is a detour, or bypass, around the failure. There are two types of protection paths: link protection and node protection.

A protection path configured for link protection is a path that bypasses a single link. In FIG. 1, for example, {R2→R3, R3→R4} is the link protection path that protects adjacency on link R2→R4. This protection path terminates at the node on the remote end of the protected link, which is R4. R4 is called the Merge Point (MP), as it is the node where the protection path merges with the primary path.

A protection path configured for node protection is a path that bypasses a next-hop node to protect against failure of that next-hop node. In FIG. 1, for example, {R2→R3, R3→R5, R5→R7} is one node protection path that can protect against failure of R4. It terminates at a node subsequent to the protected node, which is R7 (the MP). It is noted that a node protection path also provides protection from link failure (e.g., R2→R4 link failure in FIG. 1), which, in general, makes node protection a superior and preferred approach.

It is noted that FRR generally provides protection against single failure in the network, such that, if protection path also fails at the same time then traffic cannot be forwarded. The computation of a protection path is generally a complex procedure, and computation procedures generally build on proven IP-FRR concepts such as Loop Free Alternate (LFA) as defined in RFC 5286, Remote-LFA (RLFA) as defined in RFC 7490, Remote LFAs with Directed Forwarding (DLFA), Topology Independent LFA (TI-LFA), or the like, as well as various combinations thereof. These procedures generally try to compute a protection path that is "loop-free", meaning that it is guaranteed that a packet forwarded on the protection path will not be looped back towards the PLR.

As indicated above, FRR is typically based on FRR programming. The protection path is preprogramed in the data plane of a PLR. For example, assume that R2 decided to use the protection path {R2→R3, R3→R4} to protect against failure of the R2→R4 link. In this example, R2 could preprogram the protection path {R2→R3, R3→R4} in the data plane as a "backup" of {R2→R4} for use in fast rerouting of traffic as soon as R2→R4 fails. It is noted that preprogramming of protection path increases the data plane state in the PLR node.

As indicated above, FRR is typically based on FRR forwarding. When the R2→R4 link fails, flow A and flow B are diverted along the link protection path {R2→R3, R3→R4}. Upon receiving a packet, R2 pops the first hop {R2→R4} from the explicit path list and finds that corresponding next-hop has failed. So, it decides to re-route along the protection path. R2 pushes the protection path (list of hops along the protection path) on top of the packet and forwards the packet to the first next-hop in the protection path. The PLR encodes the protection path in a way such that it is consistent with the forwarding state in the MP. For example, R2 diverts flow A and flow B to R3 with the updated paths as {R3→R4, R4→R7, R7→R9} and {R3→R4, R4→R6, R6→R8, R8→R9}, respectively. It is noted that the first hop in the protection path, i.e., {R2→R3}, does not need to be pushed onto the packet by R2 as it is the immediate next-hop for R2 and, thus, R2 knows to send the packets to R3.

The communication system 100, as indicated above, is configured to support various example embodiments supporting fast rerouting of source routed packets based on global node protection. The routers 111-1-111-9 include FRR elements 112-1-112-9 (collectively, FRR elements 112), respectively. The FRR elements 112 of the routers 111 may be configured to provide various functions of various embodiments for supporting fast rerouting of source routed packets based on global node protection as presented herein (e.g., source node functions including generation of source routed packets configured to support fast rerouting of source routed packets based on global node protection, transit node functions including handling of source routed packets configured to support fast rerouting of source routed packets based on global node protection, egress node functions including handling of source routed packets configured to support fast rerouting of source routed packets based on global node protection, or the like, as well as various combinations thereof). The controller 120 includes an FRR element 121. The FRR element 121 of the controller 120 may be configured to provide various functions of various embodiments for supporting fast rerouting of source routed packets based on global node protection as presented herein (e.g., source routing path computation functions or source routing path computation support functions, control plane functions, or the like, as well as various combinations thereof).

It is noted that the ability to use various types of source routing (e.g., MPLS-based source routing, IPv4 source routing, IPv6 source routing, or the like) in various deployment scenarios (e.g., decentralized deployment scenarios or centralized deployment scenarios as discussed above) may be generalized in various ways. The ability to use various types of source routing (e.g., MPLS-based source routing, IPv4 source routing, IPv6 source routing, or the like) in various deployment scenarios may be generalized by considering generalized availability of a PCE that is configured to compute source routed paths (e.g., where the PCE may be deployed on the source node of the path (e.g., in the case of a decentralized deployment), a centralized controller (e.g., in the case of a centralized deployment), or the like). The ability to use various types of source routing (e.g., MPLS-based source routing, IPv4 source routing, IPv6 source routing, or the like) in various deployment scenarios may be generalized by considering generalized availability of PLRs that are configured to perform flow-specific fast reroute operations on source routed paths. Various example embodiments for supporting fast rerouting of source routed packets based on global node protection may be agnostic of whether explicit path computation is performed by the source node or by a centralized controller, since the source routed packets encode the global node protection (e.g., global merge points) which may be used at the PLRs for fast rerouting of source routed packets. Accordingly, in various example embodiments for supporting fast rerouting of source routed packets, including SR-TE packets, based on global node protection, the term PCE may be used generically to refer to the entity that is responsible for explicit path computation and the term PLR may be used generically to refer to the entity that performs a fast reroute based on global node protection encoded within a source routed packet.

Various example embodiments may be configured to provide improved fast rerouting of packets in packet switched networks. Various example embodiments may be configured to provide improved fast rerouting of various types of source routed packets (e.g., source routed packets, SR packets, SR-TE packets, or the like) for various types of source routing (e.g., source routing, SR, SR-TE, or the like) which may be supported in various types of packet switched networks (e.g., MPLS-based packet switch networks, IPv4-based packet switch networks, IPv6-based packet switch networks, or the like, as well as various combinations thereof). Various example embodiments may be configured to provide improved fast rerouting of source routed packets by supporting fast rerouting of source routed packets based on global node protection. Various example embodiments may be configured to provide improved fast rerouting of source routed packets by supporting fast rerouting of source routed packets based on configuration of source routed packets to support global node protection and configuration of nodes to support handling of fast rerouting of source routed packets based on configuration of source routed packets to support global node protection. Various example embodiments may be configured to provide improved fast rerouting of source routed packets by supporting fast rerouting of SR packets, including SR-TE packets, based on global node protection. Various example embodiments may be configured to provide node protection for SR-TE packets, within the context of fast rerouting of SR-TE packets, based on global node protection. Various example embodiments configured to provide node protection for SR-TE packets based on global node protection may be configured to provide node protection for SR-TE packets while obviating a need for nodes to compute common node protection paths around adjacent nodes which can be used for each of the SR-TE flows traversing the adjacent nodes (e.g., since nodes are generally agnostic of the next next-hops which decide the merge points in the case of node failures), obviating a need for nodes to program neighbor forwarding state for adjacent nodes, and so forth. Various example embodiments configured to provide node protection for SR-TE packets based on global node protection may be configured to provide node protection for SR-TE packets while obviating a need to use node protection mechanisms of the IETF "Node Protection for SR-TE Paths" (draft-hegde-spring-node-protection-for-sr-te-paths-04) document (e.g., having PLR nodes keep copies of forwarding databases of neighbor nodes, reprogramming PLR nodes for changes happening in forwarding databases of neighboring nodes, or the like), although it will be appreciated that at least some such mechanisms also could be applied). Various example embodiments configured to provide improved fast rerouting of packets in packet switched networks based on global node protection may be configured to support various other functions for supporting fast rerouting of packets in packet switched networks based on global node protection, may be configured to provide various other advantages or potential advantages related to supporting fast rerouting of packets in packet switched networks based on global node protection, or the like, as well as various combinations thereof. As discussed further hereinbelow, the communication system 100 of FIG. 1 may be configured to support fast rerouting of packets in packet switched networks based on global node protection.

Various example embodiments are configured to support rerouting of packets based on global node protection. Various example embodiments are configured to support rerouting of packets based on global node protection based on use of a global merge point (MP), where the global MP is a single MP which may be used by any PLR along the explicit path of the packet to reroute the packet upon failure of the next-hop node in the explicit path. The global MP for the explicit path may be the egress router of the explicit path for the packet. The global MP for the explicit path may be specified using an identifier of the egress router of the explicit path for the packet. The global MP for the explicit path may specified using the Prefix-SID that identifies the egress router of the explicit path for the packet. For a packet to be sent via an explicit path, the explicit path and the global MP are encoded into the packet by the ingress router of the explicit path (which also may be referred to as the head-end router of the explicit path). It is noted that, since the ingress router is aware of the egress router of any flow or explicit path, the ingress router does not require any extra computation to determine the global MP the explicit path.

The packet is routed along the explicit path based on the encoding of the explicit path within the packet and, if a node failure is encountered along the explicit path, is rerouted around the node failure based on the encoding of the global MP within the packet.

If the packet encounters no failure along the explicit path, then the packet is routed along the explicit path based on the encoding of the explicit path within the packet. When the explicit path is removed from the packet (e.g., when the packet is received by the egress node or if the packet is rerouted due to a failure on the explicit path), the global MP also is removed from the packet.

If the packet encounters a node failure along the explicit path, then PLR removes the existing explicit path from the packet and encodes a new explicit path with global MP as the only hop. The encoding of the global MP is removed, because it got encoded as the explicit path.

This means that the PLR sends the packet to the egress router with the loose explicit path that encodes the identifier (e.g., Prefix-SID) of the egress router only. The PLR forwards the packet by looking up the identifier of the egress router (e.g., by looking up the Prefix-SID in its SID Table). Similarly, all subsequent nodes forward the packet, until it reaches the egress router, based on the encoded identifier of the egress router (e.g., Prefix-SID. This method of node protection in SR is referred to herein as "global node protection".

It will be appreciated that use of a global MP obviates the need for a PLR to keep and maintain a copy of the forwarding state of each neighbor; rather, a PLR only computes its own node protection paths for each of its known Prefix SIDs, so that it can always fast-reroute the packet to a global MP (which is one of the Prefix SIDs), if the next-hop of the Prefix SID identifying the global MP also failed. This provides a simplified mechanism for providing node protection for SR, which is particularly useful for deployments of SR that require only loose QoS guarantees of flows during FRR.

Various example embodiments configured to support rerouting of packets based on global node protection may be further understood by considering the following example described within the context of FIG. 1.

In this example, assume that R1 wants global node protection for both flow A and flow B. So, R1 encodes the Prefix-SID L9 of the egress router R9 as the global MP in the packets for flows A and B.

In this example, also assume that the routers R1-R9 are each configured to support use of global node protection. A description of configuration of R2 to support use of global node protection follows and it will be appreciated that, although omitted herein, each of the routers R1 and R3-R9 may be similarly configured to support use of global node protection. For example, R2 builds its SR forwarding state for node protection by computing the node protection paths for the Prefix SIDs and determining the node protection detour paths for L6-L9 for which the respective backup next-hops were programmed. This SR forwarding state of R2 is depicted in FIG. 2, which includes an SID Lookup Table 210 and a Next-Hop Table 220. It is noted that, although omitted from FIG. 2 for purposes of clarity, R2 also may build its SR forwarding state for link protection by computing and programming link protection detour paths for each of its adjacent next-hops so that, upon link failures, it can fast-reroute the impacted packets along the link protection detour paths.

In this example, for flow A, R1 encodes the explicit path and the global MP within the packet so as to provide global node protection for flow A. For flow A, R1 sends the packet with the label stack [{L24, L47, L79}<L9>] over R1→R2. Here, the explicit path is denoted with the { } notation and the global MP is denoted with the "< >" notation. On receipt of the packet by R2, it looks up the top label L24 which results in next-hop R2→R4.

If R2→R4 is available (as indicated by the lookup using the top label L24), since R2 is the end of the segment L24, R2 pops the label and forwards the packet over R2→R4 with the label stack [{L47, L79}<L9>]. When R4 receives the packet, it looks up the top label L47 which results in next-hop R4→R7. Since R4 is end of the segment for L47, R4 pops the label and forwards the packet over R4→R7 with the label stack [{L79}<L9>]. When R7 receives the packet, it looks up the top label L79 which results in next-hop R7→R9. Since R7 is end of the segment L79, R7 pops the label. Since no more labels are left in the explicit path of the packet at this point, R7 also removes the global MP <L9>. The packet is forwarded by R7 over R7→R9 without any explicit path.

If R2→R4 is not available (as indicated by the lookup using the top label L24), R2 determines whether R2→R4 is unavailable due to a link failure of R2→R4 (in which case link protection may be used to perform fast rerouting of the packet around the failed link) or due to a node failure of R4 (in which case global node protection may be used to perform fast rerouting of the packet around the failed node). Here, assume that R2→R4 is unavailable due to a node failure of R4. Since R4 failed, and the explicit path in the packet encoded the global MP <L9>, R2 decides to fast re-route the packet to global MP <L9> using global node protection. R2 removes the existing explicit path {L24, L47, L79} from the packet, removes the global MP <L9> from the packet, and encodes the global MP <L9> as the new explicit path for the packet (such that L9 is now the only SID in the explicit path of the packet). So, the explicit path of the packet is now {L9}. R2 then looks up L9 which results in same next-hop R2→R4 that failed; however, since L9 is programmed with the backup next-hop R2→R5, R2 sends the packet over R2→R5 with the explicit path {L9}. Since <L9> is the Prefix-SID programmed into the forwarding states of all routers R1-R9, any router along the explicit path can fast-reroute the packet based on <L9> if the router encounters a failure in the next-hop node along the path to R9.

It will be appreciated that, for various example embodiments for supporting rerouting of packets based on global node protection, various aspects of the various example embodiments for supporting rerouting of packets based on global node protection (e.g., encoding of the global MP, handling of packets based on use of the global MP such as generation of packets having global MPs and processing of packets having global MPs, and so forth) may be based on the underlying dataplane of the packet switched network (e.g., MPLS, IPv4, IPv6, and so forth). This may be further understood by considering various embodiments for supporting rerouting of packets based on global node protection within the context of an MPLS dataplane.

In at least some embodiments, for supporting rerouting of packets based on global node protection within the context of an MPLS dataplane, the global MP may be encoded using a stack of two labels that includes a Global MP Label Indicator (GMPLI) Label and a Global MP Label (GMPL). In at least some embodiments, the GMPLI Label and the GMPL may be encoded as depicted in FIG. 3.

The GMPLI Label is configured to enable receiving routers along the explicit path to distinguish the labels encoding the explicit path from the GMPL that encodes the global MP. The GMPLI Label immediately precedes the GMPL, where preceding means closer to the top of the label stack (farther from bottom of stack indication). The GMPLI Label includes a 20-bit GMPLI field, a 3-bit EXP field, a 1-bit S field, and an 8-bit Time-To-Live (TTL) field. The GMPLI value for the GMPLI field may include any value suitable for enabling identification of the GMPL Label encoding the global MP. The value of the GMPLI Label can be reserved at IANA registry on special-purpose labels (e.g., https://www.iana.org/assignments/mpls-label-values/mpls-label-values.xhtml). The EXP and TTL fields in the GMPLI Label may be set to the same values as in the labels encoding the explicit path. The S bit may be set to "0" (as illustrated in FIG. 3).

The GMPL encodes the global MP that is configured to provide node protection for the explicit path. The GMPL immediately follows the GMPLI Label which, as indicated above, enables routers along the explicit path to distinguish the labels encoding the explicit path from the GMPL that encodes the global MP. The GMPL includes a 20-bit Global MP Label field, a 3-bit EXP field, a 1-bit S field, and an 8-bit Time-To-Live (TTL) field. The Global MP Label value for the Global MP Label field may include any value suitable for enabling identification of the global MP providing node protection for the explicit path. The EXP and TTL fields in the GMPL may be set to the same values as in the labels encoding the explicit path. The setting of the S bit may depend on whether more labels follow the GMPL Label (e.g., a VPN Label, a Pseudowire Label, or the like).

The routers of the explicit path for an SR packet including a global MP may process the SR packet including the global MP based on the pseudocode depicted in FIGS. 4A-4C. The procedure that is provided by the pseudocode 400 in FIGS. 4A-4C may be referred to as the Process_SR_Packet_With_Global_MP( . . . ) procedure. The input to the procedure is a packet that is encapsulated with an SR Label Stack where the labels of the SR Label Stack are denoted as the array Packet→Label[ ] (with the topmost label being Packet→Label[0]). The index to the label in the packet that is currently being processed is initialized to 0 (as indicated by label_index_in_packet=0), which points to the top label in the explicit path. The top label of the explicit path is looked up in the SID Lookup Table (as indicated by SID_Entry=SID_Lookup_Table[Packet→Label[0]]). If the end of the segment has been reached (as indicated by if (SID_Entry→End_Of_Segment)), then the top label is popped from the SR Label Stack (as indicated by Packet=Packet−Packet→Label[0]). If the end of the segment has not been reached, then the next-hop of the current label is determined from the Next-Hop Table (as indicated by Next_Hop_Entry=Next_Hop_Table[SID_Entry→Next_Hop_Index]). If the next-hop entry is operational, then the packet is sent to the next-hop (e.g., based on addition of the Layer-2 header for the next-hop onto the packet). If the next-hop entry is not operational, then an FRR operation is attempted. The FRR operation may depend on whether the link to the next-hop node is unavailable (e.g., a link protection FRR may be attempted or, if not available, a global MP based FR operation may be attempted) or whether the next-hop node itself is unavailable (e.g., a node protection FRR based on global MP may be attempted).

If only the next-hop link (and not the node) has failed and the next-hop has a link protection detour (as indicated by if (Next_Hop_Entry's link only failed AND Next-Hop_Entry→Link_Protection_Detour)), then the link protection detour may be used to reroute the packet. The first hop in the detour is looked up in the SID Lookup Table (as indicated by SID_Entry=SID_Lookup_Table[Next_Hop_Entry→Link_Protection_Detour→Label[0]]). The labels from the detour are pushed onto the SR packet with the exception of the first label/hop of the detour (as indicated by Packet=Packet+(All labels in Next_Hop_Entry→Link_Protection_Detour→Label[ ]−Next_Hop_Entry→Link_Protection_Detour→Label[0])). The packet is then sent to the first hop of the detour (as indicated by Next_Hop_Entry=Next_Hop_Table[SID_Entry→Next_Hop_Index]). If the detour has failed too, then the packet may be dropped or another FRR operation may be attempted (e.g., if the next-hop of the detour path has a protection path too).

If global node protection is to be used (e.g., the next-hop node has failed, only the next-hop link has failed but link protection is not available for the next-hop link, or the like), then global node protection is executed based on the global MP encoded within the encoding of the explicit path of the SR packet. The router processing the SR packet looks for the GMPLI Label in the SR Label Stack to determine whether global node protection is available for the explicit path of the SR packet (which is indicated as Found_GMPL=0; for (index=0; Packet→Label[index].Sbit==0; index=index+1) then if (Packet→Label[index] is GMPLI) then Found_GMPL=Packet→Label[index+1]). If the GMPLI Label is not found in the SR Label Stack (i.e., global node protection is not available), then the SR packet may be dropped (which is indicated as if (Found_GMPL==0) then go to drop_packet). If the GMPLI Label is found in the SR Label Stack (i.e., global node protection is available), the explicit path label stack and the GMPLI Label are removed from the packet so that the GMPL becomes the top (and only) label in the explicit path (which may be indicated as Packet=Packet−(All labels from Packet→Label[0] till Packet→Label[index]). At this point, the GMPL is at Packet→Label[0] and, as a result, the GMPL is looked up in the SID Lookup Table (which is indicated as SID_Entry=SID_Lookup_Table[Packet→Label[0] and Next_Hop_Entry=Next Hop Table[SID_Entry→Next_Hop_Index]). If the next-hop for the GMPL is operational, then the packet is sent to the next-hop (e.g., based on addition of the Layer-2 header for the next-hop onto the packet). If the next-hop for the GMPL is not operational, then the packet may be dropped or another FRR operation may be attempted (e.g., if the next-hop of the GMPL has a protection path too).

It is noted that the operation of routers of the explicit path for processing an SR packet including a global MP (e.g., based on the pseudocode 400 depicted in FIGS. 4A-4C) may be further understood by considering the previously described example based on FIG. 1.

In this example, for flow A, R1 encodes the explicit path and the global MP within the packet so as to provide global node protection for flow A. For flow A, R1 sends the SR packet with the label stack [{L24, L47, L79}<L9>] over R1→R2 to R2. The encoding of the explicit path for the SR packet that is sent by R1 and received by R2 is depicted in FIG. 5. On receipt of the SR packet by R2, it looks up the top label L24 which results in next-hop R2→R4.

If R2→R4 is available (as indicated by the lookup using the top label L24), since R2 is the end of the segment L24, R2 pops the label and forwards the packet over R2→R4 with the label stack [{L47, L79}<L9>]. This is depicted in FIG. 6, which depicts a modified version of the SR packet of FIG. 5, based on processing of the SR packet by router R2 of the explicit path, where global node protection is not applied for routing the packet from the transit router.

If R2→R4 is not available (as indicated by the lookup using the top label L24), R2 determines whether R2→R4 is unavailable due to a link failure of R2→R4 (in which case link protection may be used to perform fast rerouting of the packet around the failed link) or due to a node failure of R4 (in which case global node protection may be used to perform fast rerouting of the packet around the failed node). Here, assume that R2→R4 is unavailable due to a node failure of R4. Since R4 failed, and the explicit path in the packet encoded the global MP <L9>, R2 decides to fast re-route the packet to global MP <L9> using global node protection. R2 removes the existing explicit path {L24, L47, L79} from the packet, removes the global MP <L9> from the packet, and encodes the global MP <L9> as the new explicit path for the packet (such that L9 is now the only SID in the explicit path of the packet). So, the explicit path of the packet is now {L9} and R2 forwards the packet over R2→R5. This is depicted in FIG. 7, which depicts a modified version of the SR packet of FIG. 5, based on processing of the SR packet by a transit router of the explicit path, where global node protection is applied for routing the packet from the transit router. Since <L9> is the Prefix-SID programmed into the forwarding states of all routers R1-R9, any router along the explicit path can fast-reroute the packet based on <L9> if the router encounters a failure in the next-hop node along the path to R9.

It is noted that, in SR using an MPLS dataplane, a network wide unique label may be configured in the SDN controller for a Prefix-SID. In that case, the same label identifies the Prefix-SD across all routers, such as the label L9 for the router R9 in the examples above. However, a network wide unique label may not be possible in each router, if routers maintain disjoint local label spaces. In that case, in SR, a network wide unique "index" may be configured in the SDN controller for a Prefix SID. The index is the offset to the local label space in each router and, thus, while forwarding a packet with the Prefix-SID, each router encodes the Prefix-SID as Prefix-SID=base label of the label space of next-hop router+index. It is noted that the SR control plane (e.g., OSPF, IS-IS, BGP-LS, or the like) exchanges the base label and range of the label space for each router in the SR domain and, thus, the label space information of the next-hop router is available to the forwarding router. In such embodiments, the unique index for the Prefix-SID of router Rx may be denoted as Ix. So, the global MP for R9, rather than being encoded as <L9>, would be encoded as <I9>. In the continuation of the examples above, if R2 is performing fast reroute based on global MP, then R2 looks up the Prefix-SID in its forwarding state by the label=(base label of the label space in R2+I9) and sends the packet over R2→R5 with the explicit path {base label of the label space in R5+I9}. It will be appreciated that, for simplicity, various embodiments are primarily presented herein with respect to embodiments in which network wide unique labels are used for Prefix-SIDs.

It will be appreciated that, although primarily presented herein within the context of supporting rerouting of packets based on global node protection within the context of a particular type of dataplane (namely, an MPLS dataplane as discussed hereinabove), various embodiments for supporting rerouting of packets based on global node protection as presented herein also may be used or adapted for use within the context of various other types of data planes (e.g., IPv4, IPv6, or the like).

It will be appreciated that, although primarily presented herein with respect to example embodiments for supporting rerouting of a source routed packet using global node protection that is provided based on use of a global merge point (which is applicable to each of the PLRs along the path), such example embodiments may be applied or adapted for use to provide various example embodiments for supporting rerouting of a source routed packet using common node protection, which can protect any portion of the path of the source routed packet, based on use of a common merge point (which is applicable to each of the PLRs of the portion of the path that is protected by the common merge point).

It will be appreciated that various example embodiments for supporting rerouting of a source routed packet using common node protection, which can protect any portion of the path of the source routed packet, based on use of a common merge point may be further understood with respect to the following example. In this example, assume that the end-to-end path for a source routed packet includes eight nodes arranged in the following path: A-B-C-D-E-F-G-H. In this example, the source routed packet is initiated from node A with the explicit path {B→C, C→D, D→E, E→F, F→G, G→H}. In this example, rather than using global node protection to provide node protection to protect the entire path from node A to node H (in which case the egress node of the path, node H, may be encoded within the source routed packet as the global merge point), assume that node A is going to use common node protection to protect the portion of the path that includes nodes B, C, and D. In this example, it is noted that other protection mechanisms may be used to protect against link and/or node failures in the remainder of the path (namely, from node E to node H). Here, for the common merge point for the portion of the path being protected, node A may use any of the nodes of the path that are downstream of the last node in the portion of the path being protected (i.e., nodes E, F, G, or H).

In one example, assume that node A uses the node immediately following the portion of the path being protected (namely, node E) as the common merge point for common node protection. In this case, A may encode within the source routed packet the explicit path {B→C, C→D, D→E, <common MP=E>, E→F, F→G, G→H}. In this example, if node A, node B, or node C, which are protected by the common node protection, detects a next-hop node failure, each will perform the following functions for rerouting the source routed packet based on the common merge point (node E): (1) look for a common merge point in the encoding of the path (which is E in this example), (2) remove each of the explicit path hops up to the common merge point so that the explicit path becomes {<common MP=E>, E→F, F→G, G→H}, (3) remove the encoding of the common merge point (namely, <common MP=E>) from the explicit path and insert the node specified by the common merge point (in this case, node E) as the top-most hop (loose route) in the explicit path (such that, in this example, the explicit path now becomes {E, E→F, F→G, G→H}), and (4) forward the source routed packet based on the next-hop of the explicit path (in this case, node E) so that the source routed packet eventually merges back to the original explicit path at the common merge point node E. The node E receives the source routed packet based on rerouting of the source routed packet along the protection path using the common merge point E, pops "E" from the explicit path when node E determines that it is the node specified in the top hop of the explicit path such that the explicit path of the source routed packet becomes {E→F, F→G, G→H}, and further forwards the source routed packet based on that explicit path. The source routed packet is eventually received by egress node H of the path.

In another example, assume that node A uses a node downstream of the node immediately following the portion of the path being protected (e.g., node F) as the common merge point for common node protection. In this case, any PLR along the path will need to know how many hops of the explicit path need to be skipped when the source routed packet is rerouted using the common merge point. This can be encoded within the source routed packet, in conjunction with the encoding of the common merge point, using a Num_Skip_Hops parameter. In this case, A may encode within the source routed packet the explicit path {B→C, C→D, D→E, <common MP={F, Num_Skip_Hops=1}>, E→F, F→G, G→H}. It is noted that, in this example, the number of hops to be skipped is one, because use of common node protection by nodes B, C, or D will result in skipping of the single hop E→F in the path. In this example, if node B, node C, or node D, which are protected by the common node protection, detects a next-hop node failure, each will perform the following functions for rerouting the source routed packet based on the common merge point (node F): (1) look for a common merge point in the encoding of the path (which is F in this example), (2) remove each of the explicit path hops up to the common merge point so that the explicit path becomes {<common MP={F, Num_Skip_Hops=1}>, E→F, F→G, G→H}, (3) remove the number of hops in the explicit path after the common merge point based on the Num_Skip_Hop parameter encoded with the common merge point (in this case, the E→F hop is removed from the explicit path, since Num_Skip_Hops (=1), and the explicit path becomes {<common MP={F, Num_Skip_Hops=1}>, F→G, G→H}, (4) remove the encoding of the common merge point (namely, <common MP={F, Num_Skip_Hops=1}>) from the explicit path and insert the node specified by the common merge point (in this case, node F) as the top-most hop (loose route) in the explicit path (such that, in this example, the explicit path now becomes {F, F→G, G→H}), and (5) forward the source routed packet based on the next-hop of the explicit path (in this case, node F) so that the source routed packet eventually merges back to the original explicit path at the common merge point node F. The node F receives the source routed packet based on rerouting of the source routed packet along the protection path using the common merge point F, pops "F" from the explicit path when node F determines that it is the node specified in the top hop of the explicit path such that the explicit path of the source routed packet becomes {F→G, G→H}, and further forwards the source routed packet based on that explicit path. The source routed packet is eventually received by egress node H of the path.

It will be appreciated that, although primarily presented herein with respect to example embodiments in which only a single merge point (e.g., a global merge point for global node protection for the path or a common merge point for common node for a portion of the path) is encoded within a source routed packet, in at least some example embodiments multiple merge points may be encoded within a source routed packet. In at least some embodiments, for example, multiple common merge points may be encoded within the source routed packet for providing common node protection for multiple portions of the path, respectively. For example, in the example above for the path from A-H, if a first common merge point is used for PLRs B, C, D and a second common merge point is used for PLRs E, F, the encoding of the path and the common merge points may be as follows: {B→C, C→D, D→E, <common MP 1={F, Num_Skip_Hops=1}>, E→F, F→G, <common MP 2={H, Num_Skip_Hops=1}, G→H}. In at least some embodiments, for example, a global merge point for providing global node protection for the path and one or more common merge points for providing common node protection for one or more portions of the path, respectively, may be encoded within the source routed packet for providing various levels of node protection for the source routed packet. For example, in the example above for the path from A-H, if a common merge point is used for PLRs B, C, D and a global merge point is used for PLRs B-G, the encoding of the path and the merge points may be as follows: {B→C, C→D, D→E, <common MP={F, Num_Skip_Hops=1}>, E→F, F→G, G→H, <global MP=H>}, such that the common merge point may be used by B, C, and D when operating as PLRs for the source routed packet and the global merge point may be used by any of B-G when operating as PLRs for the source routed packet. It will be appreciated that various other combinations of node protection may be used to protect source routed packets.

Figure 8:
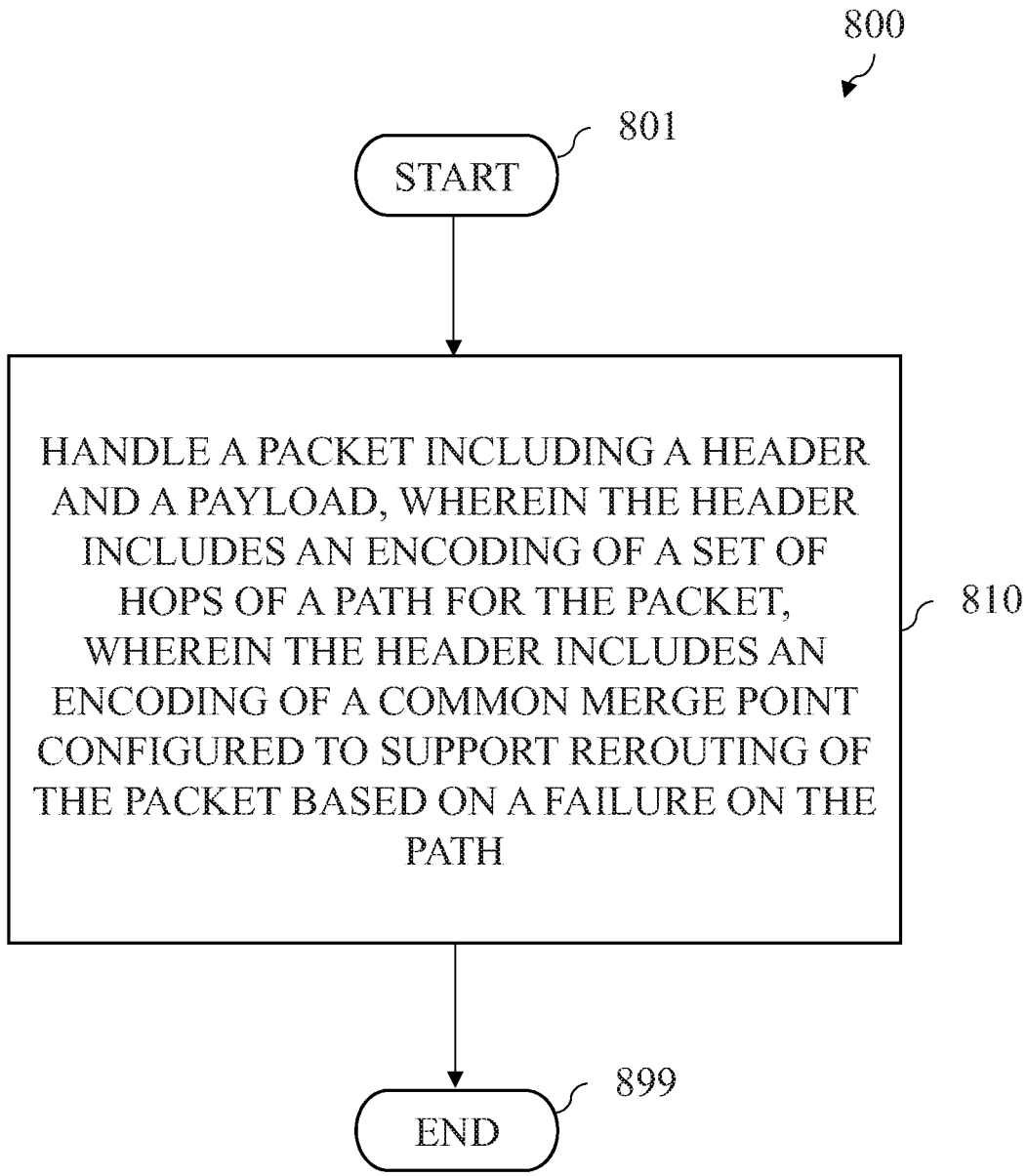
FIG. 8 depicts an example embodiment of a method for supporting handling of a packet based on common node protection.

FIG. 8 depicts an example embodiment of a method for supporting handling of a packet based on common node protection. It will be appreciated that, although primarily presented as being performed serially, at least a portion of the functions of method 800 may be performed contemporaneously or in a different order than as presented with respect to FIG. 8. At block 801, method 800 begins. At block 810, handle a packet including a header and a payload, wherein the header includes an encoding of a set of hops of a path for the packet, wherein the header includes an encoding of a common merge point configured to support rerouting of the packet based on a failure on the path. At block 899, method 800 ends. It will be appreciated that the packet may be a source routed packet or other suitable type of packet. It will be appreciated that various features presented herein with respect to FIGS. 1-7 may be incorporated within the context of method 800 of FIG. 8.

Various example embodiments for supporting rerouting of packets based on common node protection may provide various advantages or potential advantages. For example, example embodiments for supporting rerouting of packets based on common node protection may provide improved fast rerouting of source routed packets by supporting fast rerouting of SR packets, including SR-TE packets, based on global node protection. For example, example embodiments for supporting rerouting of packets based on common node protection may provide node protection for SR-TE packets, within the context of fast rerouting of SR-TE packets, based on global node protection. For example, example embodiments for supporting rerouting of packets based on common node protection may provide node protection for SR-TE packets while obviating a need for nodes to compute common node protection paths around adjacent nodes which can be used for each of the SR-TE flows traversing the adjacent nodes (e.g., since nodes are generally agnostic of the next next-hops which decide the merge points in the case of node failures), obviating a need for nodes to program neighbor forwarding state for adjacent nodes, and so forth. For example, example embodiments for supporting rerouting of packets based on common node protection may provide node protection for SR-TE packets while obviating a need to use node protection mechanisms of the IETF "Node Protection for SR-TE Paths" (draft-hegde-spring-node-protection-for-sr-te-paths-04) document (e.g., having PLR nodes keep copies of forwarding databases of neighbor nodes, reprogramming PLR nodes for changes happening in forwarding databases of neighboring nodes, or the like), although it will be appreciated that at least some such mechanisms also could be applied). Various example embodiments for supporting rerouting of packets based on global node protection may provide various other advantages or potential advantages.

Figure 9:
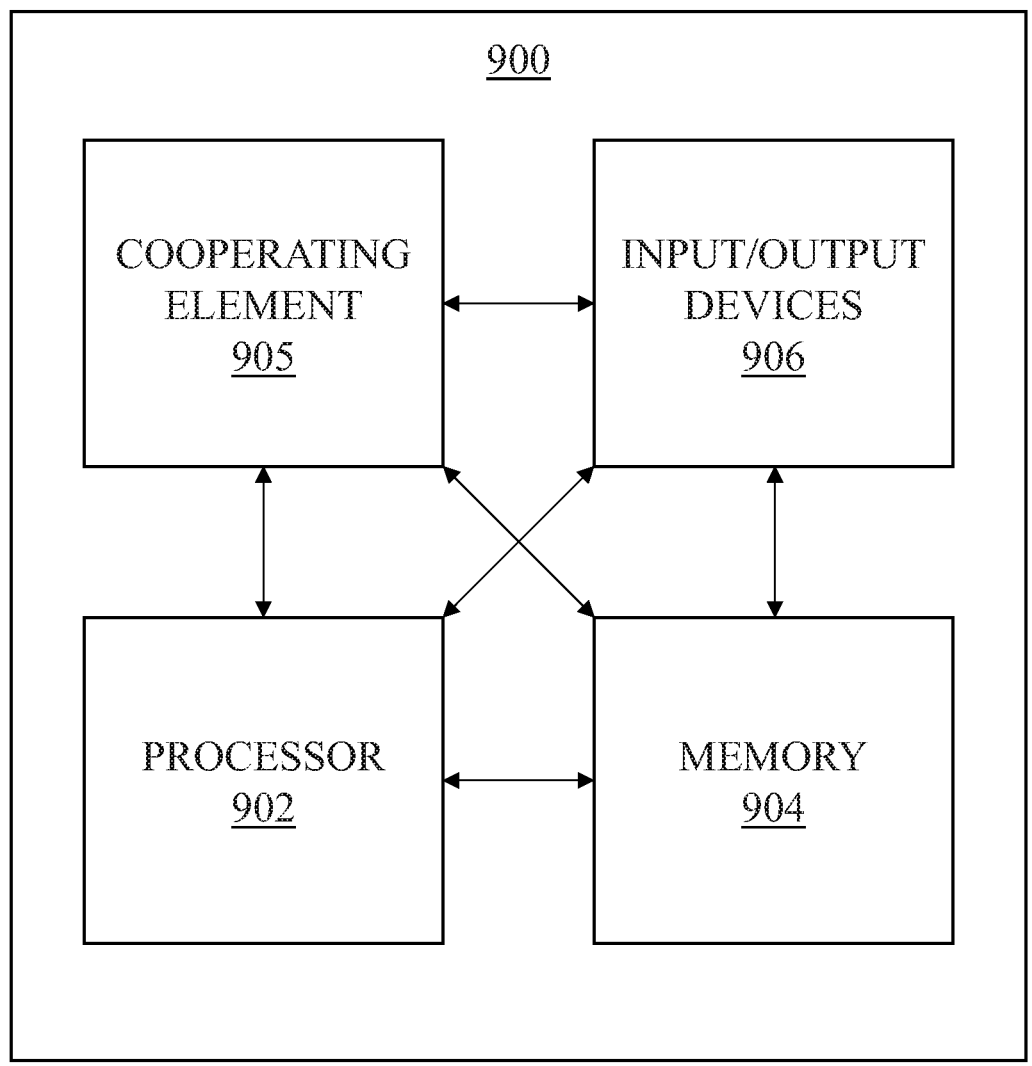
FIG. 9 depicts an example embodiment of a computer suitable for use in performing various functions presented herein.

FIG. 9 depicts an example embodiment of a computer suitable for use in performing various functions presented herein.

The computer 900 includes a processor 902 (e.g., a central processing unit, a processor, a processor having a set of processor cores, a processor core of a processor, or the like) and a memory 904 (e.g., a random access memory, a read only memory, or the like). The processor 902 and the memory 904 may be communicatively connected. In at least some embodiments, the computer 900 may include at least one processor and at least one memory including computer program code, wherein the at least one memory and the computer program code are configured to, with the at least one processor, cause the computer to perform various functions presented herein.

The computer 900 also may include a cooperating element 905. The cooperating element 905 may be a hardware device. The cooperating element 905 may be a process that can be loaded into the memory 904 and executed by the processor 902 to implement various functions presented herein (in which case, for example, the cooperating element 905 (including associated data structures) can be stored on a non-transitory computer-readable storage medium, such as a storage device or other suitable type of storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, computer 900 may provide a general architecture and functionality that is suitable for implementing one or more elements presented herein, such as a router 111 or a portion thereof, an FRR element 112 or a portion thereof, a controller 120 or a portion thereof, an FRR element 121 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings

What is claimed is:

1. An apparatus, comprising:
   at least one processor; and
   at least one memory storing instructions that, when executed by the at least one processor, cause the apparatus to at least:
      handle a packet including a header and a payload, wherein the packet includes an encoding of a set of hops of a path for the packet and an encoding of a common merge point associated with the set of hops of the path, wherein the common merge point is a node of the path where a protection path merges back with the path, wherein the encoding of the common merge point is arranged between the payload and the encoding of the set of hops of the path, wherein the encoding of the common merge point includes an identifier of the common merge point.

2. The apparatus of claim 1, wherein the packet comprises a source routed packet.

3. The apparatus of claim 1, wherein the encoding of the set of hops of the path includes a label stack including a set of labels encoding the respective hops in the set of hops of the path.

4. The apparatus of claim 3, wherein the encoding of the common merge point includes a second label stack including a first label encoding an indicator configured to indicate that the common merge point is assigned to protect each of the hops in the set of hops of the path and a second label encoding the identifier of the common merge point.

5. The apparatus of claim 4, wherein the second label stack is disposed below the label stack in the packet.

6. The apparatus of claim 1, wherein the set of hops of the path includes a set of nodes including an ingress node of the path and an egress node of the path, wherein the common merge point is the egress node of the path.

7. The apparatus of claim 1, wherein the set of hops of the path includes a set of nodes including at least one transit node of the path and an egress node of the path, wherein the common merge point is the egress node of the path.

8. The apparatus of claim 1, wherein the set of hops of the path includes at least two transit nodes of the path, wherein the common merge point is one of the at least two transit nodes closest to an egress node of the path.

9. The apparatus of claim 1, wherein the packet is based on a Multiprotocol Label Switching (MPLS) protocol.

10. The apparatus of claim 9, wherein the encoding of the common merge point includes an MPLS label encoding the identifier of the common merge point.

11. The apparatus of claim 1, wherein the packet is based on segment routing (SR).

12. The apparatus of claim 11, wherein the identifier of the common merge point includes a segment identifier (SID) of the common merge point.

13. The apparatus of claim 1, wherein the packet is based on an Internet Protocol (IP) protocol.

14. The apparatus of claim 13, wherein the identifier of the common merge point includes an IP address of the common merge point.

15. The apparatus of claim 1, wherein, to handle the packet, the instructions, when executed by the at least one processor, cause the apparatus to at least:
   generate the packet at an ingress node of the path; and
   send the packet from the ingress node toward a next-hop node of the path.

16. The apparatus of claim 1, wherein, to handle the packet, the instructions, when executed by the at least one processor, cause the apparatus to at least:
   receive the packet at a transit node of the path;
   determine, based on the encoding of the set of hops of the path, a next-hop node of the path; and
   forward the packet toward the next-hop node of the path based on a determination that the next-hop node of the path is reachable along the path.

17. The apparatus of claim 1, wherein, to handle the packet, the instructions, when executed by the at least one processor, cause the apparatus to at least:
   receive the packet at a transit node of the path;
   determine, based on the encoding of the set of hops of the path, a next-hop node of the path; and
   initiate, based on a determination that the next-hop node of the path is unreachable along the path, rerouting of the packet from the transit node toward an egress node via the protection path based on the common merge point.

18. The apparatus of claim 17, wherein, to initiate rerouting of the packet from the transit node toward the egress node, the instructions, when executed by the at least one processor, cause the apparatus to at least:
   modify the packet, including removing from the header the encoding of the set of hops of the path and configuring the packet based on use of the common merge point as an endpoint of the protection path, to form a modified packet; and send the modified packet from the transit node toward a next-hop node of the protection path.

19. The apparatus of claim 17, wherein the protection path is a loose path.

20. The apparatus of claim 1, wherein, to handle the packet, the instructions, when executed by the at least one processor, cause the apparatus to at least:
receive the packet at an egress node of the path; and
forward the payload of the packet.

21. A non-transitory computer-readable storage medium comprising program instructions that, when executed by an apparatus, cause the apparatus to at least:
handle a packet including a header and a payload, wherein the packet includes an encoding of a set of hops of a path for the packet and an encoding of a common merge point associated with the set of hops of the path, wherein the common merge point is a node of the path where a protection path merges back with the path, wherein the encoding of the common merge point is arranged between the payload and the encoding of the set of hops of the path, wherein the encoding of the common merge point includes an identifier of the common merge point.

22. A method, comprising:
handling a packet including a header and a payload, wherein the packet includes an encoding of a set of hops of a path for the packet and an encoding of a common merge point associated with the set of hops of the path, wherein the common merge point is a node of the path where a protection path merges back with the path, wherein the encoding of the common merge point is arranged between the payload and the encoding of the set of hops of the path, wherein the encoding of the common merge point includes an identifier of the common merge point.

* * * * *